(12) United States Patent
Saleem et al.

(10) Patent No.: US 8,879,438 B2
(45) Date of Patent: Nov. 4, 2014

(54) RESOURCE EFFICIENT ACOUSTIC ECHO CANCELLATION IN IP NETWORKS

(75) Inventors: Adnan Saleem, Surrey (CA); Mohammed Aamir Husain, Surrey (CA); Timothy S. Woinoski, Coquitlam (CA); Neil M. Gunn, Coquitlam (CA)

(73) Assignee: Radisys Corporation, Hillsboro, OR (US)

( * ) Notice: Subject to any disclaimer, the term of this patent is extended or adjusted under 35 U.S.C. 154(b) by 155 days.

(21) Appl. No.: 13/468,947

(22) Filed: May 10, 2012

(65) Prior Publication Data

US 2012/0287769 A1 Nov. 15, 2012

Related U.S. Application Data

(60) Provisional application No. 61/484,981, filed on May 11, 2011.

(51) Int. Cl.
*H04B 3/20* (2006.01)
*H04M 9/08* (2006.01)

(52) U.S. Cl.
CPC .................................... *H04M 9/082* (2013.01)
USPC ........... 370/286; 370/287; 370/288; 370/289; 379/406.01; 379/406.02; 379/406.03

(58) Field of Classification Search
CPC ....... H04M 9/082; H04M 9/08; H04M 3/002; H04M 3/56; H04B 3/23; H04B 3/234; H04B 3/231; H04B 3/237; G10L 15/30; G10L 21/02; G10L 21/0205
USPC ................ 370/286–292; 379/406.01–406.16; 709/204–207
See application file for complete search history.

(56) References Cited

U.S. PATENT DOCUMENTS

| | | | |
|---|---|---|---|
| 5,721,923 A * | 2/1998 | Hamilton | ...................... 718/104 |
| 6,724,736 B1 | 4/2004 | Azriel | |
| 6,738,358 B2 | 5/2004 | Bist et al. | |
| 7,006,616 B1 | 2/2006 | Christofferson et al. | |
| 7,075,921 B2 | 7/2006 | Siegrist et al. | |
| 7,085,374 B2 | 8/2006 | Schulz | |
| 7,113,580 B1 | 9/2006 | DellaMorte, Sr. et al. | |
| 7,149,305 B2 | 12/2006 | Houghton | |
| 7,206,404 B2 | 4/2007 | Parry et al. | |

(Continued)

OTHER PUBLICATIONS

Notification of Transmittal of the International Search Report and the Written Opinion of the International Searching Authority, or the Declaration for PCT/CA2012/000449, Filed May 11, 2012.

*Primary Examiner* — Awet Haile
*Assistant Examiner* — Eric Myers
(74) *Attorney, Agent, or Firm* — Stoel Rives LLP

(57) ABSTRACT

System and methods provide acoustic echo monitoring and cancellation for real time media processing in an internet protocol (IP) media server in an IP network. An echo monitor is configured to selectively compare audio streams into and out of the IP media server through a selected port. The comparison determines an occurrence of an echo. An echo canceller in communication with the echo monitor is configured to respond to the determination by the echo monitor so as to remove the echo from at least one of the audio streams. A talk burst detector may be used to detect speech in at least one of the audio streams through the selected port. The echo monitor selectively compares the audio streams in response to a signal from the talk burst detector that indicates detection of speech.

42 Claims, 8 Drawing Sheets

(56) References Cited

U.S. PATENT DOCUMENTS

| | | | |
|---|---|---|---|
| 7,283,543 B1 * | 10/2007 | Thompson | 370/401 |
| 7,304,962 B1 | 12/2007 | Kirla et al. | |
| 7,443,812 B2 | 10/2008 | Tackin et al. | |
| 7,477,682 B2 | 1/2009 | LeBlanc | |
| 7,480,377 B2 | 1/2009 | Bershad et al. | |
| 8,467,321 B1 * | 6/2013 | Groenjes et al. | 370/260 |
| 2005/0286466 A1 | 12/2005 | Tagg et al. | |
| 2006/0165068 A1 * | 7/2006 | Dalton et al. | 370/352 |
| 2006/0217969 A1 | 9/2006 | Sukkar et al. | |
| 2007/0263848 A1 | 11/2007 | Sukkar | |
| 2008/0240080 A1 | 10/2008 | Patait | |
| 2009/0043577 A1 | 2/2009 | Godavarti | |
| 2010/0278067 A1 * | 11/2010 | LeBlanc | 370/252 |
| 2011/0069830 A1 | 3/2011 | Chu et al. | |
| 2012/0206564 A1 * | 8/2012 | Potekhin et al. | 348/14.09 |
| 2012/0236845 A1 * | 9/2012 | Li et al. | 370/352 |
| 2013/0258909 A1 * | 10/2013 | Ramalho et al. | 370/260 |

* cited by examiner

RESOURCE EFFICIENT ACOUSTIC ECHO CANCELLATION IN IP NETWORKS

RELATED APPLICATION

This application claims the benefit under 35 U.S.C. §119 (e) of U.S. Provisional Application No. 61/484,981, filed May 11, 2011, which is hereby incorporated by reference herein in its entirety.

TECHNICAL FIELD

The embodiments described herein relate to the field of acoustic echo monitoring and cancellation in audio signals and streams carried over internet protocol (IP) networks.

BACKGROUND OF THE DISCLOSURE

Echo is typically introduced by phone terminals operating in speakerphone mode or by a hybrid that converts a 2-wire analog circuit to 4-wire transmission lines in public switched telephone network (PSTN) networks. In an IP network, the echo (acoustic and/or hybrid) is carried through from the terminals and is subject to variable delays and jitter. In an IP conferencing system, echo introduced by any of the participants is heard by all the participants, other than the terminal(s) introducing the echo, leading to poor quality of the audio conference. Monitoring and removal of echo from IP audio streams is a significantly expensive operation from a media processing resource utilization perspective.

IP based conference servers are typically referred to as IP media servers that are employed in telephony networks and perform a variety of basic and enhanced services, which include conferencing, audio and video interactive voice response (IVR), transcoding, audio and video announcements, and other advanced speech services. IP media servers may also be employed in networks that provide video conferencing services, as well as typical data exchange services of the sort that occurs over the internet, over virtual private networks, within wide area networks and local area networks, and the like. Data exchange and processing performed by the media server is based on packet processing with fixed maximum processing time requirements.

IP multimedia conferencing servers allow a number of participants to join a conference. The conference service provides for the mixing of participants' media by a mixer resource, allowing all participants to hear or see other participants as they become active during the conference. The conference mixer resource may use media from all participants to determine which participants will be heard or seen during conference operation as active participants. The set of active participants can dynamically change in real time as a given participant stops contributing while another participant starts contributing.

A single instance of a conferencing service may be distributed over N processors, where N>=1. A set of media processing servers may be collocated within the same physical server or may be distributed over a number of physical servers inter-connected via IP communications interfaces over near or far locations.

Regardless of the conference mixer resources being collocated or distributed, the user experience of the services and participant interaction in the conference preferably should not be altered. For instance, in an audio conference, all participants, regardless of the conference mixer resources being geographically distributed or collocated, should hear the same conference output mix.

IP multimedia peer-to-peer servers allow two participants to participate in a two-way conference.

SUMMARY OF THE DISCLOSURE

In one embodiment, a system provides acoustic echo monitoring and cancellation for real time media processing in an internet protocol (IP) network. The system includes an IP media server including a plurality of ports for providing real time peer-to-peer services or audio mixing of a number of participants of an audio conference. The IP media server includes an echo monitor configured to selectively compare audio streams into and out of the IP media server through a selected port of the plurality of ports. The comparison determines an occurrence of an echo. The IP media server also includes an echo canceller in communication with the echo monitor. The echo canceller is configured to, in response to the determination by the echo monitor, remove the echo from at least one of the audio streams. In certain such embodiments, the IP media server further includes a talk burst detector configured to detect speech in at least one of the audio streams through the selected port. The echo monitor selectively compares the audio streams in response to a signal from the talk burst detector indicating detection of speech.

In another embodiment, a method for acoustic echo monitoring and cancellation includes selectively comparing audio streams into and out of a selected port of an IP media server. The comparison determines an occurrence of an echo. In response to the determination of the occurrence of the echo, the method further includes removing the echo from at least one of the audio streams. In certain such embodiments, the method also includes detecting speech in at least one of the audio streams through the selected port, wherein selectively comparing the audio streams occurs in response to the detection of speech.

Additional aspects and advantages will be apparent from the following detailed description of preferred embodiments, which proceeds with reference to the accompanying drawings.

BRIEF DESCRIPTION OF THE DRAWINGS

The various embodiments will now be described in more detail, by way of example only, with reference to the accompanying drawings, in which.

DETAILED DESCRIPTION OF PREFERRED EMBODIMENTS

I. Introduction

Acoustic echo cancellation (AEC) is a technique to remove echo on incoming ports. Acoustic echo is typically introduced when a terminal is operating in speakerphone mode and has either no built-in echo canceller or a poor one. Acoustic echo arises in a conference when a portion of the conference audio sent to the speaker of a user's terminal is picked up by the microphone and is fed back to the conference mix to be heard by all conference users (except the one that generated the echo). Echo may also be introduced on a public switched telephone network (PSTN) terminal in the hybrid that converts the 2-wire analog circuit to 4-wire transmission lines. Echo cancellation generally cannot distinguish between acoustic and hybrid echo and attempts to cancel them both. Echo is very distracting when the echo delay gets too much greater than about 50 ms.

The tail length of an echo is the length of time between the initial onset of the echo until the echo has substantially diminished (e.g., by 30 dB or more). A standard conference room has an echo tail of approximately 64 ms.

The bulk delay of an echo is the length of time between a media server outputting an utterance to a beginning of the corresponding echo on the media server input. The bulk delay includes the roundtrip network delay, the acoustic delay in the echo path, and any delays in the terminal and media server (e.g., jitter, packetization, codec delays, etc). Echoes in VoIP networks generally have larger delays (up to 512 ms) and can be perceptually more annoying. Conventional acoustic echo cancellation techniques, as used by terminals, are not realistic in this scenario and instead the network echo canceller makes use of the bulk delay information in estimating and cancelling the echo. An echo canceller with a 64 ms echo tail can effectively cancel an echo with a 64 ms tail as long as the correct bulk delay is known. On the media server, the bulk delay is measured, since it can vary widely from call to call and is not known. The presence or absence of echo and the bulk delay on IP audio streams is measured by an echo monitoring resource, which may be an expensive operation from a media processing resource utilization perspective. The cancellation of echo is handled by echo cancellation resources that may also add to an expensive operation from a media processing resource utilization perspective.

Embodiments disclosed herein provide the ability to monitor and cancel acoustic echo on a large number of audio streams, while preserving scarce media processing resources. The VoIP network, according to certain embodiments, adds increased delays, clock skew and additional impairments, which makes the task of accurate estimation of bulk delay and acoustic echo cancellation difficult.

Figure 1:
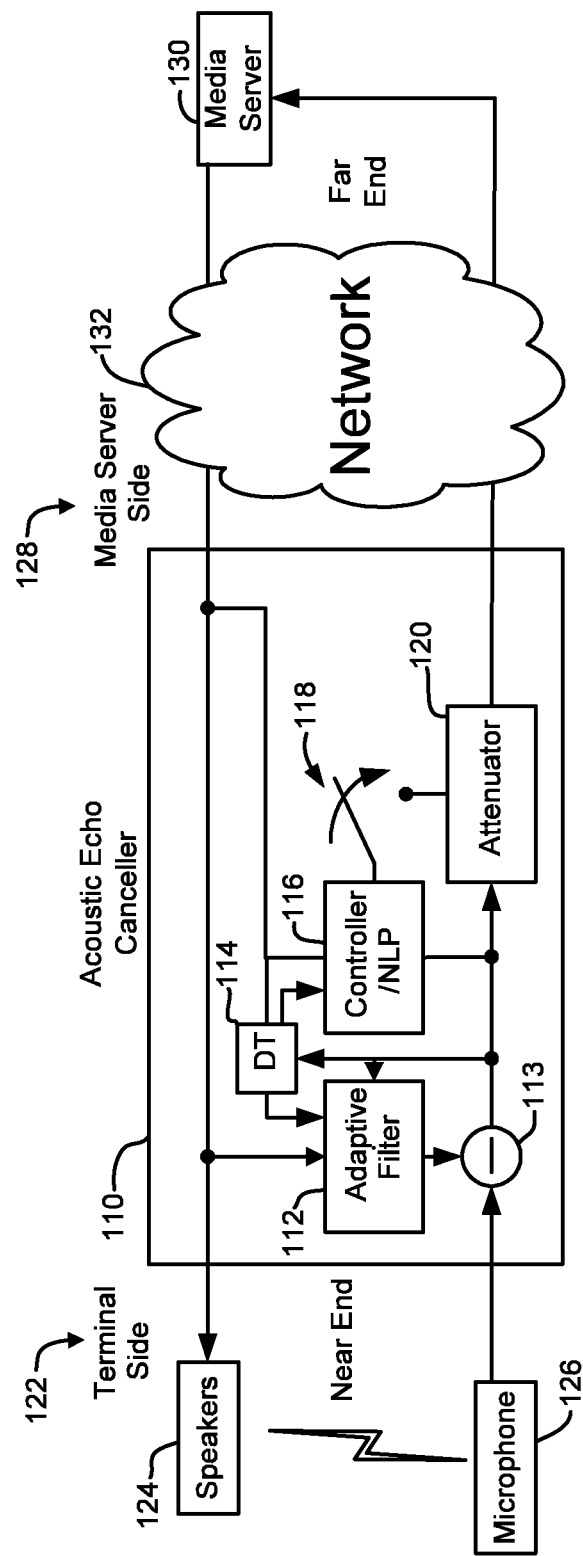
FIG. 1 is a block diagram illustrating a typical terminal based acoustic echo cancellation solution.

FIG. 1 is a block diagram illustrating a typical terminal based acoustic echo canceller (AEC) 110. In this example, the AEC 110 includes an adaptive filter 112, a subtractor 113, a double talk (DT) detector 114, a controller and/or non-linear processor (NLP) 116, a switch 118, and an attenuator 120. The AEC 110 includes a terminal side 122 for connecting to speakers 124 and a microphone 126 of a terminal at a "near end" relative to a user. The AEC 110 also includes a media server side 128 for connecting to a media server 130 through a network 132 (e.g., the internet) at a "far end" relative to the user.

Audio arriving from the media server 130 (the far end) is fed to the adaptive filter 112 in the AEC 110 as well as to the terminal's speaker 124 (the near end) where it is partially picked up by the microphone 126. The adaptive filter is configured to simulate the echo path in the terminal so that any echo picked up by the terminal's microphone 126 is removed by the subtractor 113 in the AEC 110. Incomplete echo removal results in updates to the adaptive filter 112 using a least means square algorithm until the adaptive filter 112 converges to the echo path. The presence of near end speech (doubletalk) interferes with the convergence. Thus, doubletalk is detected by the DT detector 114, which then prevents the adaptive filter 112 from updating.

Any non-linearities in the echo path may result in some residual echo that cannot be removed by the linear adaptive filter 112. The controller and/or NLP 116 removes this residual echo by switching in and out (e.g., as graphically represented by the switch 118) the attenuator 120 whenever the echo controller and/or NLP 116 determines that there is echo with no doubletalk (i.e., no near end speech). During doubletalk, the controller and/or NLP 116 is not active and only the adaptive filter 112 is used for reducing echo. Any residual echo in this case is passed through unaffected, but may be masked by the near end speech.

Note that for a given terminal, there is a fixed minimum delay between the audio sent to the speakers 124 and the echoed audio. This delay is called the bulk delay. To maximize the effectiveness of acoustic echo cancellation, the AEC 110 typically does not attempt to cancel echoes occurring before the bulk delay.

Figure 2:
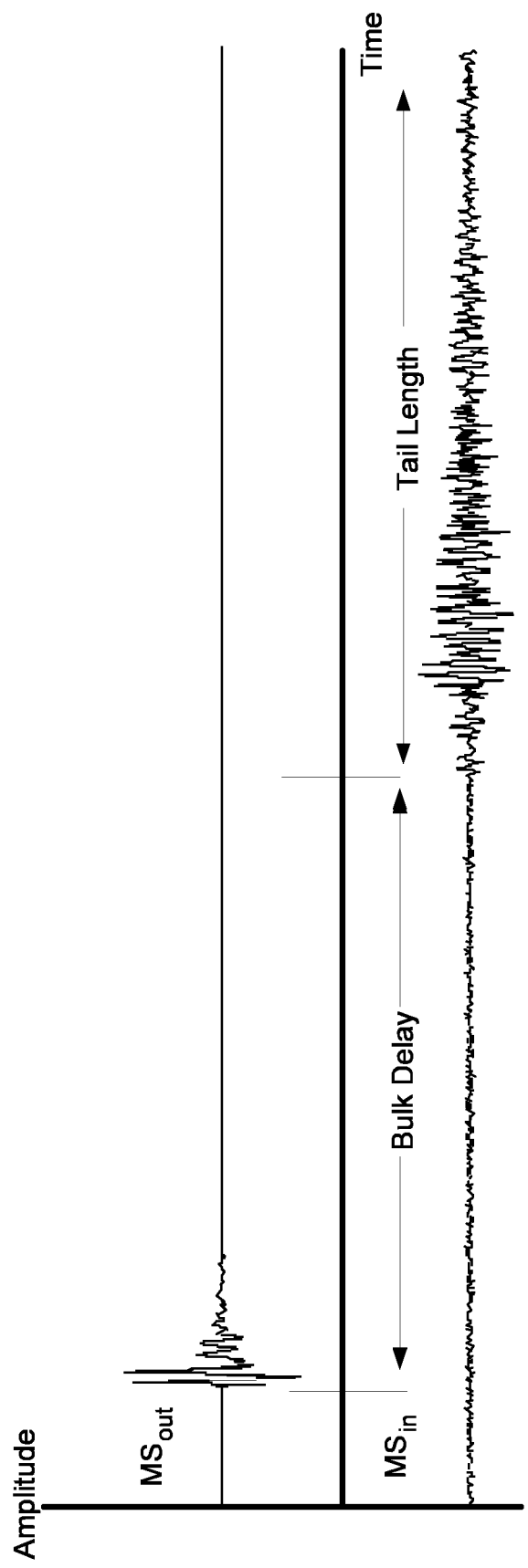
FIG. 2 includes graphs illustrating a difference between bulk delay and echo tail length in either terminal based or network based acoustic echo cancellation solutions.

FIG. 2 includes graphs illustrating a difference between bulk delay and echo tail length in either terminal based or network based acoustic echo cancellation solutions. With reference to FIG. 1, the graph on the top of FIG. 2 (the media server output (MSout)) shows the audio being fed to the speakers 124 at the near end and the graph on the bottom of FIG. 2 (the media server input (MSin)) shows the echo signal picked up by the microphone 126 at the near end. The bulk delay is the time difference between the signal sent to the speaker and its echo, while the tail length is the length of time that the echo reverberates.

Figure 3:
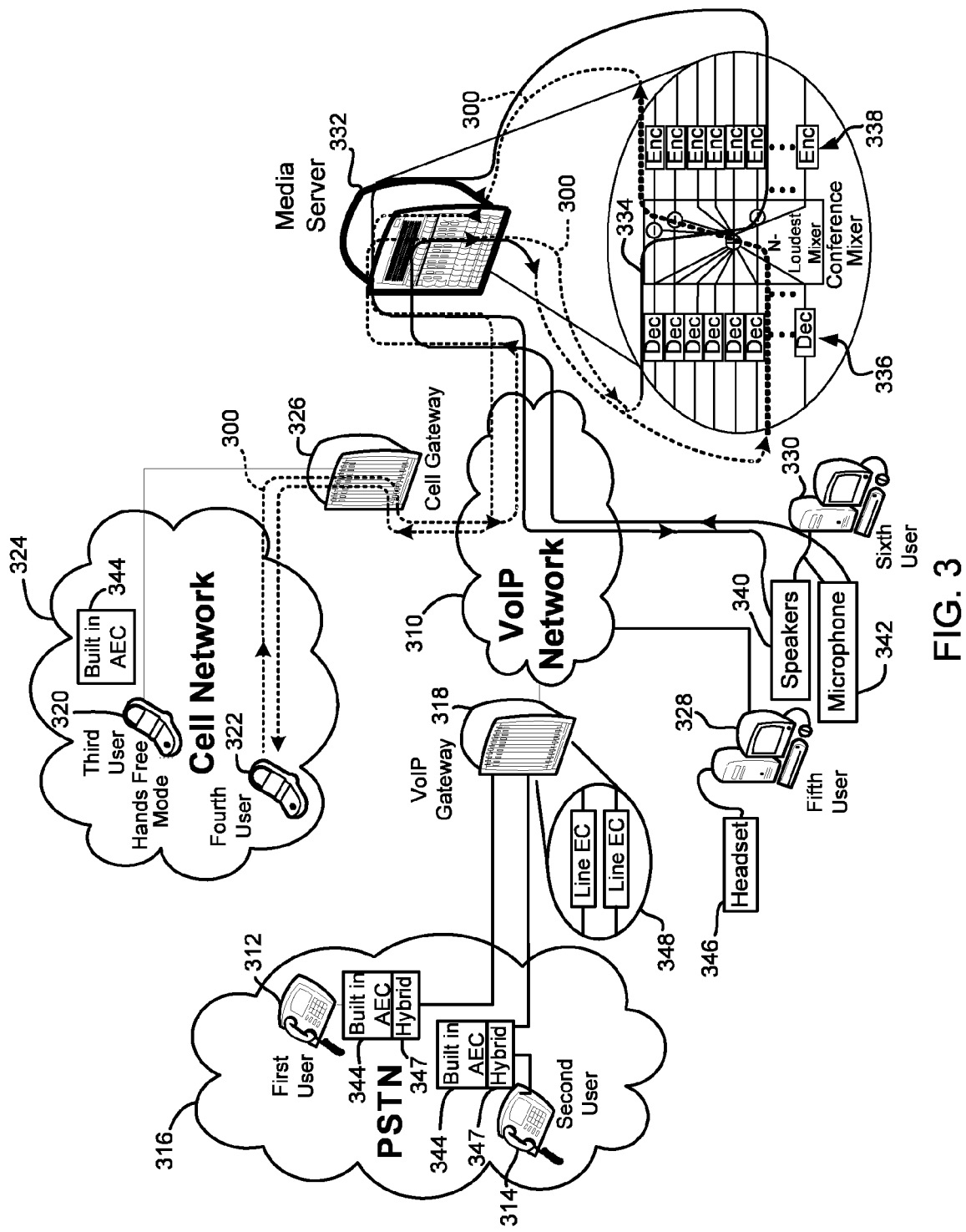
FIG. 3 is a block diagram illustrating an echo path in a typical conferencing scenario within a VoIP network.

FIG. 3 is a block diagram illustrating an echo path 300 in a typical conferencing scenario within a VoIP network 310. In this example, a first user 312 and a second user 314 communicate through a PSTN 316 and a VoIP gateway 318 to the VoIP network 310, a third user 320 and a fourth user 322 communicate through a cellular telephone network (referred to herein as a "cell network") 324 through a cellular (cell) gateway 326 to the VoIP network 310, and a fifth user 328 and a sixth user 330 communicate directly with the VoIP network 310 (e.g., using computers with wired or wireless connectivity, which may include network devices such as routers and gateways). The illustrated echo path 300 is between the fourth user 322 and the sixth user 330.

Two or more of the first user 312, second user 314, third user 320, fourth user 322, fifth user 328, and sixth user 330 (the "conference participants") may communicate with one another in a conference call through a media server 332 that is in communication with the VoIP gateway 318. As schematically represented in FIG. 3, the media server 332 includes a conference mixer 334. In certain embodiments, the conference mixer 334 is configured to mix voice or other data from the current N-loudest conference participants in the conference call. Data received from the conference participants are decoded by a plurality of decoders 336 ("dec") before being input to the conference mixer 334. Data output from the conference mixer 334 to the respective conference participants are encoded by a plurality of encoders 338.

Each of the conference participants produces a different amount of acoustic echo depending on their particular setup. The worst offenders for acoustic echo are typically speakerphones (e.g., the sixth user 330 utilizes a system including speakers 340 and microphone 342) and hands free cellular phones (e.g., the third user 320 and fourth user 322), although these devices may be designed to reduce coupling between the speaker and the microphone. Even with good design minimizing the direct echo path, audio reflections from office walls and furniture causes unwanted echoes. The direct echo combined with the reflections spreads out the duration of the echo and creates what is known as an echo tail (see the tail length shown in FIG. 2), which may last up to 50 ms or more in a small conference room.

High end conference phones may include echo cancellation (e.g., the first user 312, second user 314, and third user 320 each include built in AEC 344), but typical office speaker phones do not. Particularly bad are soft clients (e.g., the sixth user 330) that may use cheap personal computer (PC) speakers 340 and microphones 342 with no particular thought given to reduce acoustic coupling. Soft clients often offer the choice of echo cancellation but it is typically not enabled or properly configured. Telephone headsets (e.g., headset 346 used by the fifth user 328) do not typically have a problem with echo unless they are left sitting on a desk, in which case the echo reflected off the desk can create an echo problem.

Another form of echo can occur in the 2-wire to 4-wire conversion in a hybrid of a PSTN telephone (e.g., hybrid 347 shown with respect to the first user 312 and the second user 314). This echo is known as hybrid echo and has a very short tail length. Hybrid echo is typically cancelled in the PSTN telephone network 316 or the VoIP gateway 318 (e.g., illustrated as line echo cancellers (EC) 348) but can also be cancelled by an acoustic echo canceller.

As mentioned above, the illustrated echo path 300 is between the fourth user 322 and the sixth user 330. In this case, the audio from cellular phone of the fourth user 322 passes through the cell network 324 to the media server 332, where it gets added to the conference mix and sent to the sixth user 330. The microphone 342 of the sixth user 330 picks up some of the conference audio which is sent back to the media server 332 to be added to the conference. The conference mix is then heard by all conferencing participants, except the sixth user 330. Note that the fourth user 322 hears his/her own voice coming back at him/her with essentially twice the round trip network delay (the delay from the fourth user 322 to the media server 332 to the sixth user 330, and then back again), which could easily be 100 ms or more.

Figure 4:
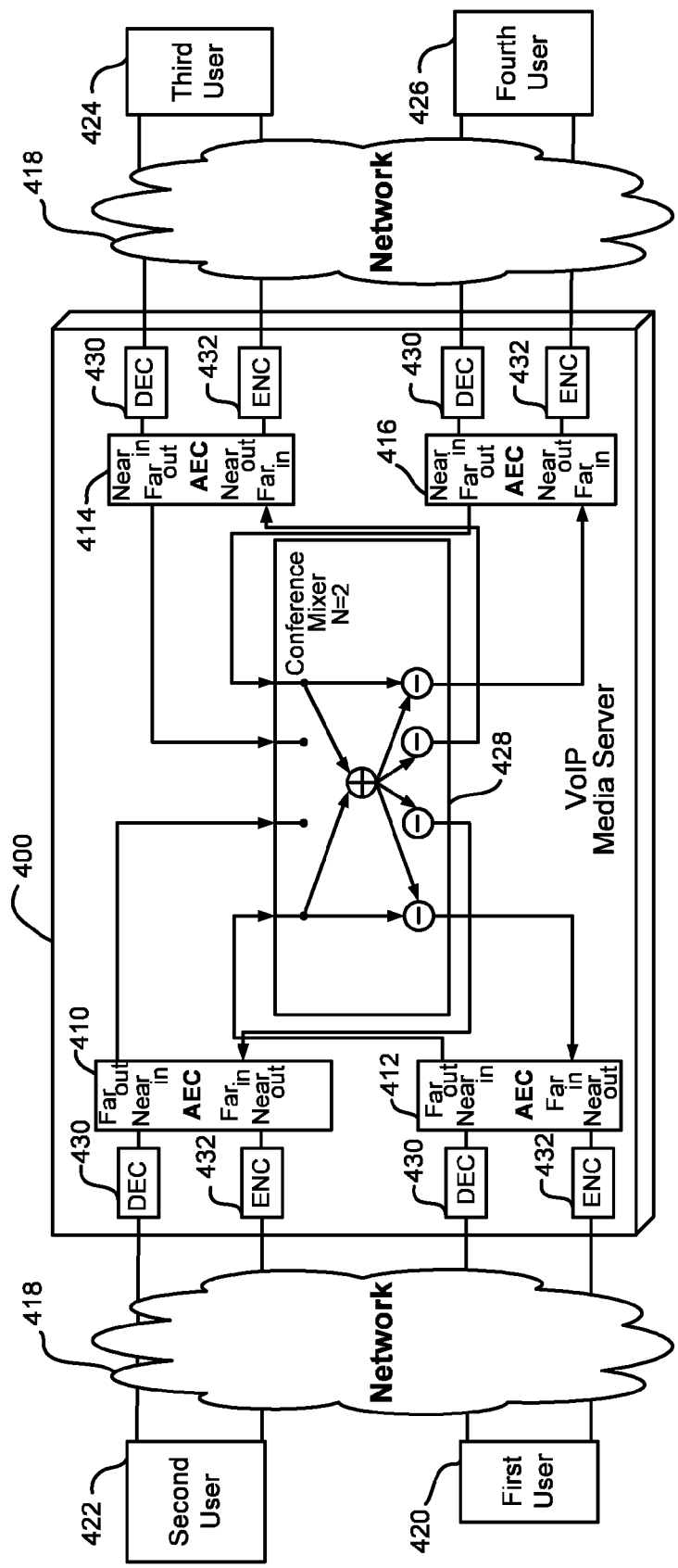
FIG. 4 is a block diagram illustrating a VoIP media server configured to perform acoustic echo cancellation for a conferencing service according to one embodiment.

FIG. 4 is a block diagram illustrating a VoIP media server 400 configured to perform acoustic echo cancellation for a conferencing service according to one embodiment. The VoIP media server 400 may also be referred to herein as "IP media server" or "media server." In this case, the VoIP media server 400 performs network based AEC as opposed to terminal based AEC. Note that for a network based AEC, the bulk delay is no longer fixed and is much larger since it includes the transmission delays in the network, several of which may change during the call (such as adaptive jitter buffers, etc.).

The VoIP media server 400 includes a plurality of AECs 410, 412, 414, 416, one for each port. In this example embodiment, the VoIP media server 400 includes four ports for communicating through a network 418 with a first user 420, a second user 422, a third user 424, and a fourth user 426. However, skilled persons will recognize from the disclosure herein that in other embodiments the VoIP media server 400 may have any number of ports for communicating with, and providing conferencing services for, any number of users. The VoIP media server 400 also includes a conference mixer 428, a plurality of decoders (DEC) 430, and a plurality of encoders (ENC) 432.

An incoming real time transfer protocol (RTP) stream from each port is decoded by a respective decoder 430 and then input to the near side of the respective AEC 410, 412, 414, 416, which removes the echo. The echo removed signal passes out of the far side of the respective AEC 410, 412, 414, 416 to the conference mixer 428 where it is mixed and sent to the other users 420, 422, 424, 426. The mixed audio for each user passes into the far side of the respective AEC 410, 412, 414, 416 where it is used by an adaptive filter (see adaptive filter 112 in FIG. 1) to predict the incoming echo signal.

In some embodiments, the AECs 410, 412, 414, 416 in the VoIP media server 400 do not actually change the output signal of the conference mixer 428. Thus, the conference output in such embodiments does not need to pass through the AECs 410, 412, 414, 416, as shown in FIG. 4, but can be passed directly on to the encoders 432.

Figure 5:
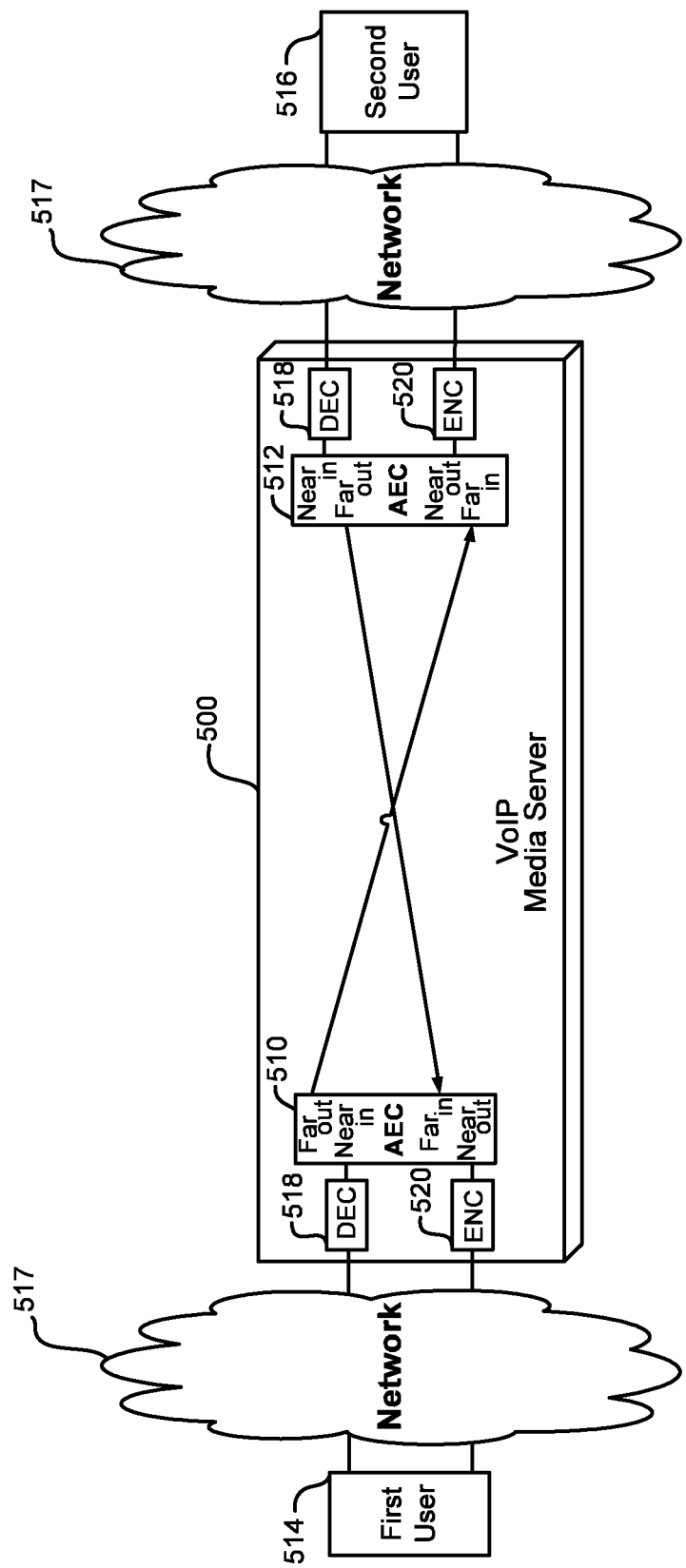
FIG. 5 is a block diagram illustrating a VoIP media server configured to perform acoustic echo cancellation for a peer-to-peer service according to one embodiment.

FIG. 5 is a block diagram illustrating a VoIP media server 500 configured to perform acoustic echo cancellation for a peer-to-peer service according to one embodiment. The VoIP media server 500 may also be referred to herein as "IP media server" or "media server." Much like in FIG. 4, the VoIP media server 500 performs network based AEC as opposed to terminal based AEC. The VoIP media server 500 includes an AEC 510, 512 for each port, which are respectively in communication with a first user 514 and a second user 516 through a network 517. The AECs 510, 512 are each coupled to the respective ports through decoders 518 and encoders 520.

An incoming RTP stream from each port is decoded by a respective decoder 518 and then input to the near side of the respective AEC 510, 512, which removes the echo. The echo removed signal passes out of the far side of the respective AEC 510, 512 and is sent to the other user. The audio then passes into the far side of the respective AEC 510, 512, where it is used by the adaptive filter (see adaptive filter 112 in FIG. 1) to predict the incoming echo signal. In certain embodiments, the AECs 510, 512 in the VoIP media server 500 do not actually change the output signal (i.e., received on the far in input of the AEC). In such embodiments, the output signal does not need to pass through the AEC as shown in FIG. 5, but can be passed directly to the respective encoder 520.

Figure 6:
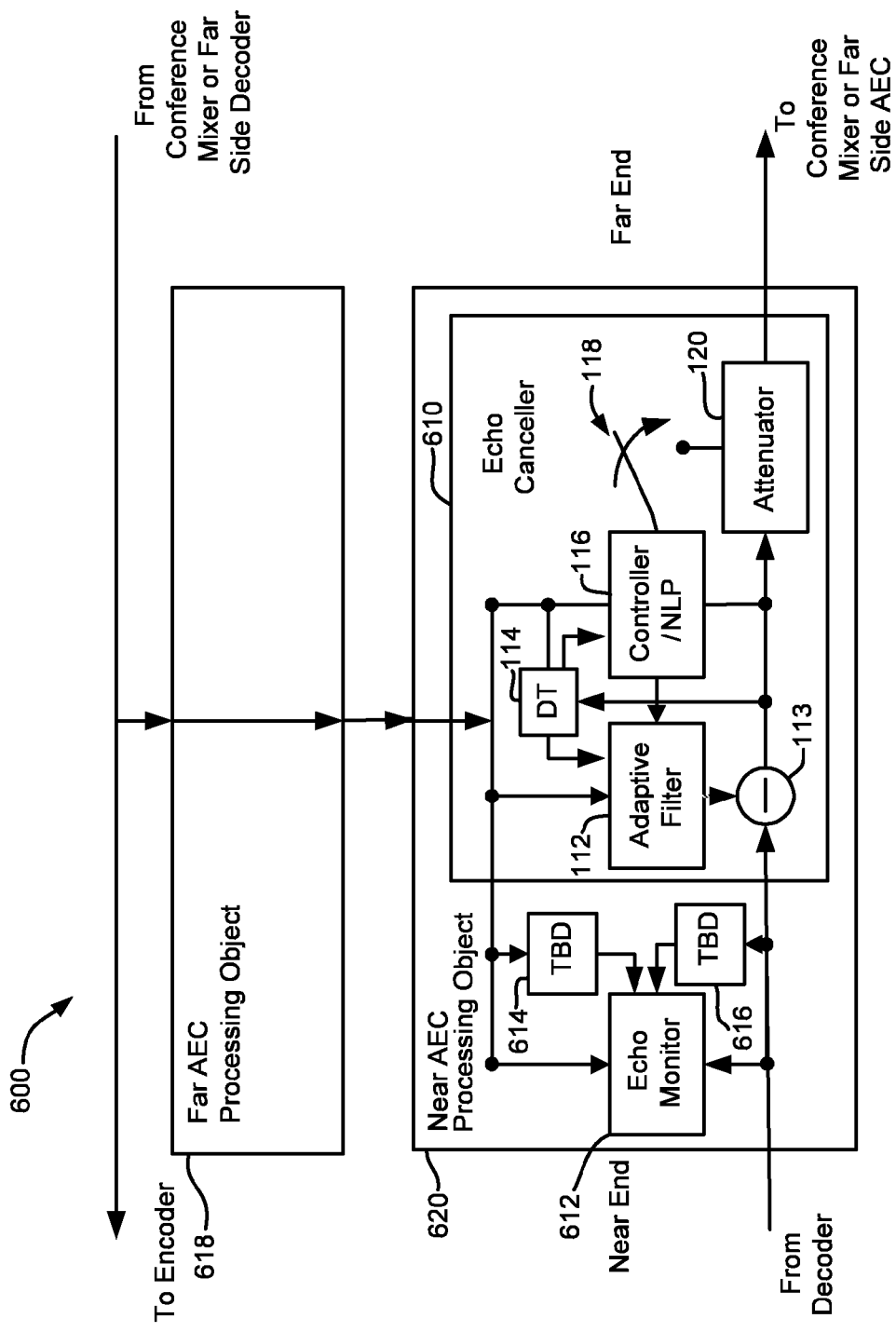
FIG. 6 is a block diagram illustrating an AEC used in a media server according to one embodiment.

FIG. 6 is a block diagram illustrating an AEC 600 used in a media server (e.g., media server 400 shown in FIG. 4 or media server 500 shown in FIG. 5) according to one embodiment. Like the terminal based AEC 110 shown in FIG. 1, the AEC 600 includes an echo canceller 610 that includes the adaptive filter 112, the subtractor 113, the double talk (DT) detector 114, the controller and/or non-linear processor (NLP) 116, the switch 118, and the attenuator 120. However, the AEC 600 shown in FIG. 6 also includes an echo monitor 612 and talk burst detectors (TBDs) 614, 616. In certain embodiments, as discussed in detail below, the echo canceller 610 and/or the echo monitor 612 may be selected from a plurality of processing resources.

In the example embodiment shown in FIG. 6, the AEC functionality is divided into a far AEC processing object 618 and a near AEC processing object 620. As used herein, a "processing object" is a broad term having its normal and customary meaning, and may be implemented using software, hardware, or a combination of software and hardware.

The far AEC processing object 618 samples the output signal to the port. The near AEC processing object 620 does the bulk of the work of the echo cancelling functionality, and includes the TBDs 614, 616 and the echo monitor 612. The reason to split the AEC function into a far AEC processing object 618 and a near AEC processing object 620 is an implementation consideration that does not take away from the spirit or scope of the embodiments disclosed herein, as will be apparent to those skilled in the art in the light of the disclosure contained herein.

The echo monitor 612 compares the input to the encoder (far end, e.g., received at the "$Far_{in}$" terminal of the AEC from the mixer 428 (FIG. 4) or from a far side AEC (FIG. 5)) with the input from the decoder (near end, e.g., received at the "$Near_{in}$" terminal of the AEC as shown in FIGS. 4 and 5) looking for correlation at varying delays from zero to a maximum supported bulk delay. As may be apparent to those skilled in the art, many possible measures can be used to correlate a representation of the far side signal with a similar representation of the near side signal to find a match that is used to determine an estimate of the echo and the bulk delay of the echo. Many alterations and modifications are possible in the actual echo monitoring process without departing from the spirit or scope thereof and are not central to the practice of the embodiments disclosed herein. In certain embodiments, echo monitoring only occurs when the TBD 614 detects a talk burst in the far side since this far end speech may be a necessary condition for an echo. Note that echo cancelling cannot begin until a bulk delay estimate is made, which may require the presence of an actual echo. In addition, or in other embodiments, the echo monitor 612 is configured to estimate the echo return loss (ERL) of the echo in the audio stream.

Note that to increase performance according to certain embodiments, the media server shares limited echo monitor resources across multiple ports and applies limited echo cancellation resources only to the ports that need it the most (i.e., the ones with the smallest ERL). This is covered in more detail herein in the subsequent sections.

Figure 7:
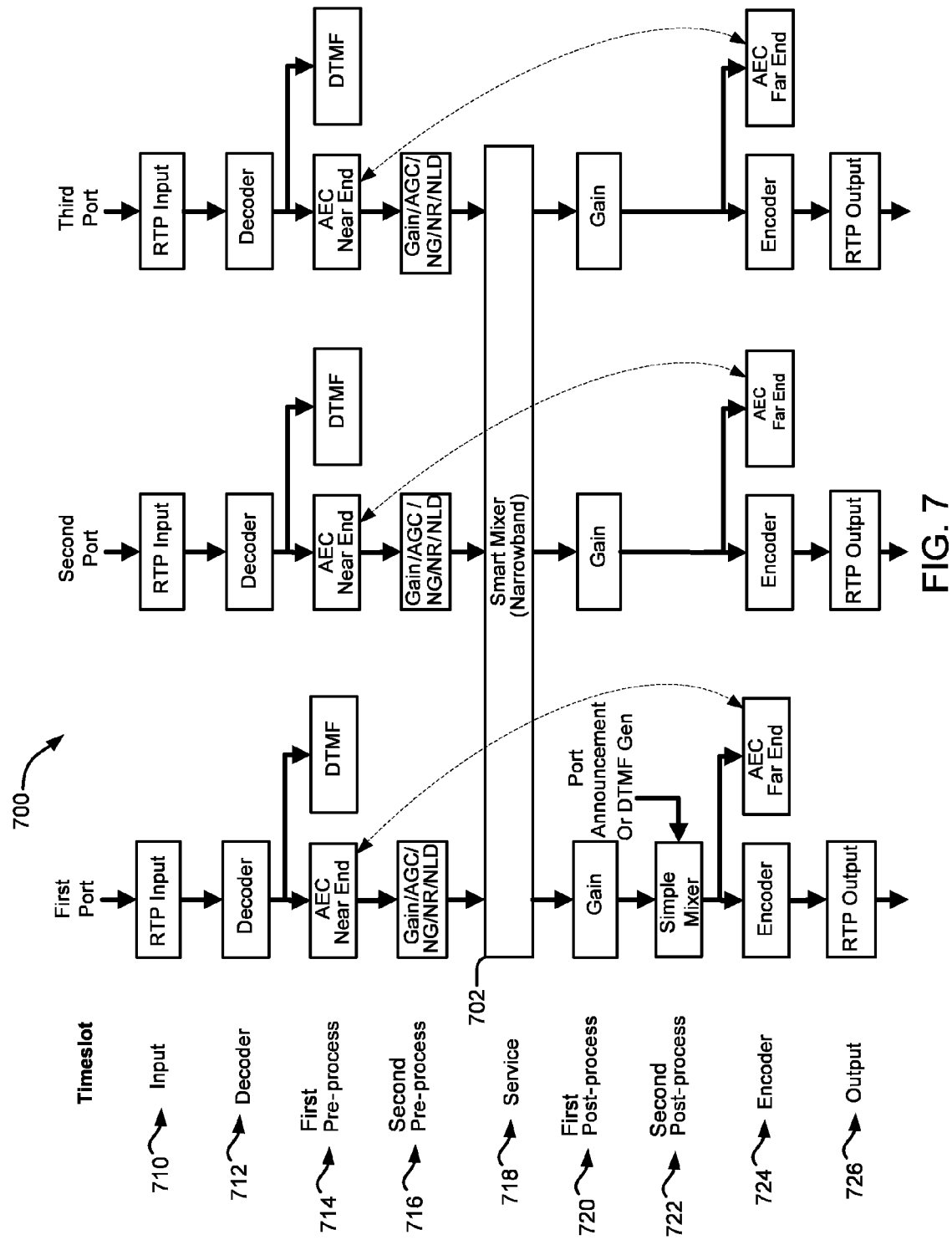
FIG. 7 is a flowchart illustrating a method, from an AEC processing object view, of an example three port narrowband audio conference with acoustic echo cancellation according to one embodiment.

FIG. 7 is a flowchart illustrating a method 700, from an AEC processing object view, of an example three port narrowband audio conference with acoustic echo cancellation according to one embodiment. In this example embodiment, the AEC 600 shown in FIG. 6 is configured to provide echo cancelling, wherein the near AEC processing object 620 is inserted in the input signal path to a smart mixer 702 just after a decoder, and wherein the far AEC processing object 618 samples the conference output just before an encoder. The method 700 is shown with respect to a plurality of steps performed in respective timeslots for a first port, a second port, and a third port.

In an input step 710, one or more of the ports receive RTP input. In a decoder step 712, the RTP input is decoded. In a first pre-process step 714, the near AEC 620 performs echo cancelling functions, as described herein. The first pre-processing step 714 may also include processing for dual-tone multi-frequency (DTMF) signaling. A second pre-processing step 716 may include one or more functions such as gain, automatic gain control (AGC), noise gating (NG), noise reduction (NR), and/or noisy line detection (NLD). In a service step 718, the smart mixer 702 mixes the signals from the first port, the second port, and the third port.

A first post-process step 720 provides gain for the output of the smart mixer 702. In a second post-processor step 722, a simple mixer may be used to mix the output of the smart mixer 702 with port announcements and/or DTMF generated signals. In an encoder step 724, the mixed output signal is encoded. The far AEC processing object 618 receives the same signal as the encoder in order for echo cancellation to work not just for the conference audio but also for port announcements or DTMF generation, as shown by the dotted lines. In an output step 726, the RTP output is provided to the respective ports.

The near AEC processing object 620 and the far AEC processing object 618 are linked, as shown by the dotted line. In certain embodiments, the near AEC processing object 620 does the bulk of the work, relying only on the far AEC processing object 618 to sample the far end signal.

Figure 8:
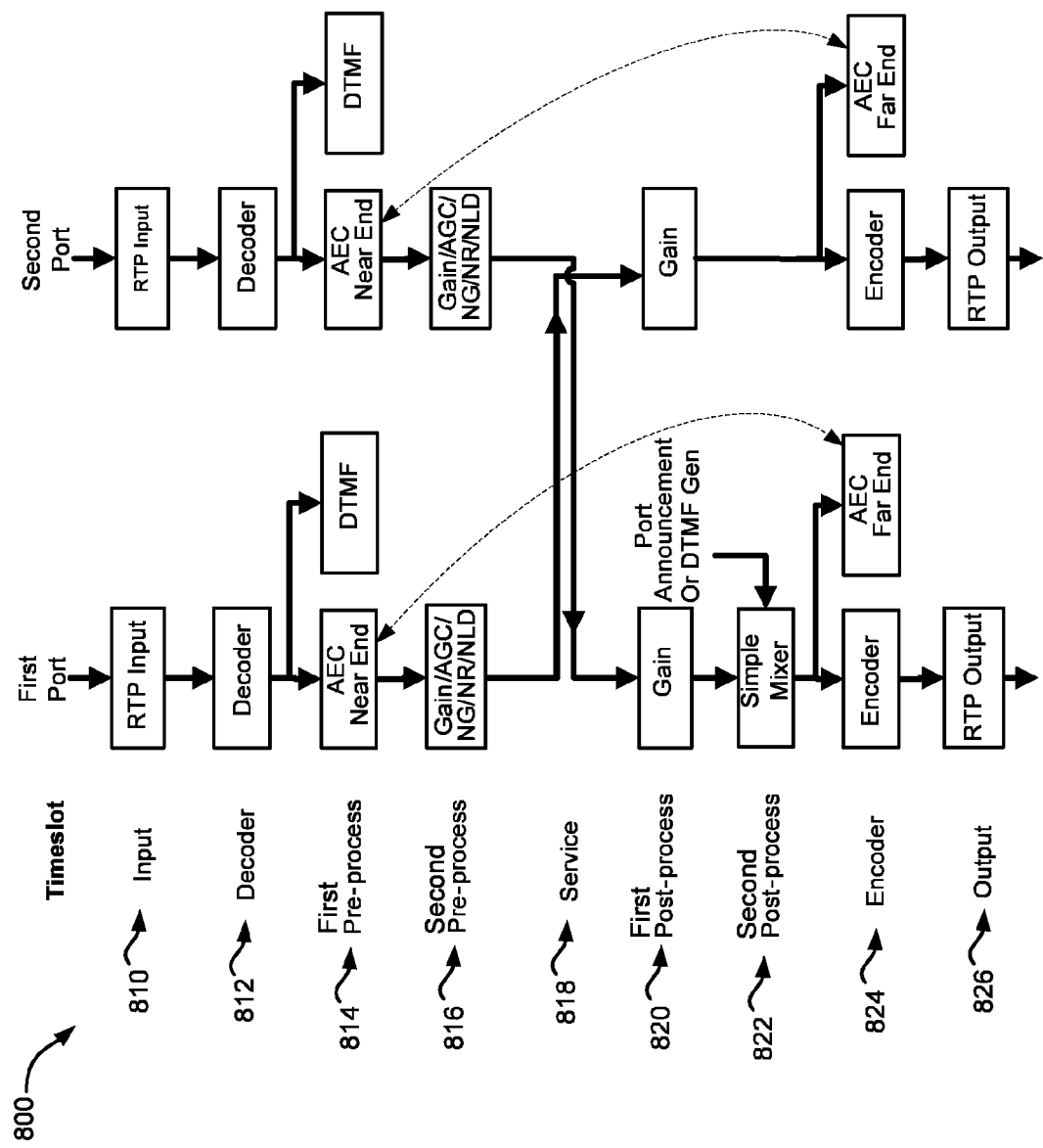
FIG. 8 is a flowchart illustrating a method 800, from an AEC processing object view, of an example two port peer-to-peer service with acoustic echo cancellation according to one embodiment.

FIG. 8 is a flowchart illustrating a method 800, from an AEC processing object view, of an example two port peer-to-peer service with acoustic echo cancellation according to one embodiment. In this example embodiment, the AEC 600 shown in FIG. 6 is configured for echo cancelling, wherein the near AEC processing object 620 is inserted in the input signal path just after the decoder, and wherein the far AEC processing object 618 samples the decoded output just before the encoder. The method 800 is shown with respect to a plurality of steps performed in respective timeslots for a first port and a second port.

In an input step 810, one or both of the ports receive RTP input. In a decoder step 812, the RTP input is decoded. In a first pre-process step 814, the near AEC 620 performs echo cancelling functions, as described herein. The first pre-processing step 814 may also include processing for DTMF signaling. A second pre-processing step 816 may include one or more functions such as gain, AGC, NG, NR, and/or NLD. In a service step 818, the processed RTP input of the first port is provided to the second port for output, and the processed RTP input of the second port is provided to the first port for output.

A first post-process step 820 provides gain for signal received from the other port. In a second post-processor step 822, a simple mixer may be used to mix the signal from the other port with port announcements and/or DTMF generated signals. In an encoder step 824, the mixed output signal is encoded. The far AEC processing object 618 receives the same signal as the encoder in order for echo cancellation to work, much like is the case for conferencing. In an output step 826, the RTP output is provided to the respective ports.

II. Echo Monitoring

With respect to FIG. 6, echo monitoring is now described for embodiments including a plurality (or pool) of echo monitors 612 (or processing resources) that may be shared among a plurality of near AEC processing objects 620. When activated, near AEC processing objects 620 within a media server (see, e.g., the VoIP media server 400 in FIG. 4 or the VoIP media server 500 shown in FIG. 5) start looking for talk bursts (e.g., using TBD 616). Once a talk burst is found, a near AEC processing object 620 looks first for a free echo monitor 612 within its pool to check for the presence of echo and, if present, to measure its echo return loss (ERL) and its bulk delay. Note that in certain embodiments the bulk delay cannot be estimated if there is no measurable echo.

If there is a free echo monitor 612, the near AEC processing object 620 uses it and returns it to the pool later when its measurement is complete. If there are no free echo monitors 612, the near AEC processing object 620 tries again on each 10 ms update until an echo monitor 612 is free or until the talk burst goes away. If the talk burst goes away before a free echo monitor 612 is found, then the near AEC processing object 620 waits until a new talk burst is detected before it starts looking for an echo monitor 612 again. In certain embodiments, it may also be that an echo monitor 612 is found but the talk burst is too short to be useful for detecting echo, in which case the echo monitor 612 returns to the pool with no echo detected.

If the number of echo monitors 612 is too low, there may be quite a bit of contention for them. If a near AEC processing object 620 needs an echo monitor 612, and an echo monitor 612 is free, the near AEC processing object 620 takes the free echo monitor 612. If the near AEC processing object 620 cannot get an echo monitor 612, the near AEC processing object 620 simply keeps trying. In one embodiment, a method for prioritizing echo monitor requests considers the length of time that a near AEC processing object 620 has been waiting and possibly the strength of any previous echo measurement. The method places the echo monitor requests in a queue according to different priorities, with the items at the top of the queue having higher priority and getting faster access to echo monitors 612. The size of the queue is a configurable parameter. The queue length may be zero (i.e., no queue), in which case there is no attempt to queue echo monitor requests so that they are served in any particular order.

Echo monitoring can take up to the maximum supported bulk delay plus an additional configurable duration of the suitable far-end talk burst. The maximum supported bulk delay is configurable and indicates the maximum possible delay inherent through the network.

In one embodiment, the echo monitoring portion of the near AEC processing object 620 includes two state machines that control the behavior of the TBDs 614, 616 and the echo monitors 612.

The TBDs (both the far-end TBD 614 and the near-end TBD 616) include two states, which are: "not in talk burst;" and "in talk burst." The TBD 614, 616 returns whether a talk burst is detected or not every processing cycle.

The echo monitor 612 includes 2 states, which are: "wait for echo monitor" and "echo monitor started."

In the "wait for echo monitor" state, the port waits for the appropriate timer to be satisfied, the far end to then be in a talk burst, and echo monitor resources being available. An "echo_found_timer" is used when the echo monitor 612 obtains a reliable estimate of the bulk delay as an echo is present in the near end signal (e.g., from the decoder). At this point in time, if sufficient echo cancelling resources are available, echo monitor 612 turns on the echo canceller 610.

Once a bulk delay estimate has been found, it is likely that the bulk delay estimate may change over time due to changing network conditions. The time over which little change may be expected can be considered as the time interval $T_{BDE\_change\_interval}$. So at every $T_{BDE\_change\_interval}$, an updated estimate of the bulk delay may be obtained so as to prevent the echo canceller 610 from diverging during echo cancellation. This time duration is a configurable parameter and could be in the order of about 30 seconds. Once this time has elapsed, and the start of the next far end talk burst is found, if echo monitoring resources are available, it restarts the echo monitor 612 and computes an updated estimate of the bulk delay. If resources are not available, it waits for the next available resource.

An "echo_not_found_timer" is used when the echo monitor 612 does not find an echo as one is not present in the near end signal. At this point in time, if the echo canceller 610 is currently turned on, the echo monitor 612 may turn the echo canceller 610 off, indicating that an echo has disappeared and echo cancelling resources are no longer needed. It is likely that in subsequent times due to changing acoustic conditions, an echo may be introduced or re-introduced. The time after which the near AEC processing object 620 re-tests for the presence of an echo can be considered as the time interval $T_{BDE\_off\_interval}$. This time duration is a configurable parameter and could be in the order of about 5 seconds. Once this time has elapsed, and the start of the next far end talk burst is found, if resources are available, the echo monitor 612 restarts and computes whether an echo has appeared and, if so, computes an estimate of the bulk delay. If resources are not available, the near AEC processing object 620 waits for the next available resource.

Waiting to find a talk burst in the far end signal is desirable to obtain an estimate of the bulk delay by looking for a correlated version of a near end signal in the earlier far end signal. If the talk burst detected event is received and resources are available, then resources may be committed to doing echo monitoring immediately. However, if the talk burst detected event is received and resources are currently unavailable, then this request is queued and considered depending on where it falls in the queue which in turn depends on the previous estimate of the ERL. The size of the queue is a configurable parameter. The queue length may be zero (i.e., no queue).

The strategy used in this example implementation is a compromise between a strategy where resources are wholly allocated on a first come first serve basis (no queue) and one where they are allocated purely on a priority basis. This strategy makes use of both these alternative strategies. It may be that all resources are already used up monitoring for echo for other ports. In such a case, resources are unavailable to monitor echoes for this port and it will have to try again in the next processing cycle window. If some resources have been freed up, this port gets this echo monitor resource, provided that it is in the top of the queue of ports waiting for resources. If this port is not in the top of the queue, it will stay in this state waiting for echo monitor resources. If the TBD state changes to "not in talk burst" state, then the particular port will have to wait until the next talk burst starts before it can make another request for an echo monitor resource, as it is not quite ready for bulk delay estimation, as it no longer has a far end talk burst to correlate the near end signal against.

The queue includes ports ordered with the highest previously computed ERL at the bottom of the queue and the lowest previously computed ERL at the top of the queue. So as resources free up, if the current port has had a previous ERL value that was high, it may have too low a priority to get echo monitor resources and it would have to wait until more resources free up. On the other hand, if the current port had a previous ERL value that was low, it would have a higher priority. If the port had no previous ERL estimate, i.e., it had never measured an estimate of the bulk delay, it would then have the highest priority so that echo monitor resources could be allocated to it and a determination made as to whether it has echo. To ensure that a port that has a high ERL value eventually does get an echo monitor resource, a timer may be used to measure how long the port has been waiting for an echo monitor resource. If the timer exceeds a configurable time, the port is moved up to the top of the queue, if it is currently in it, and then it finds the next available resource with an estimated ERL of zero, i.e., indicating it does not have a valid bulk delay estimate as the current measurement is probably too old now and should not have an undue influence in dictating whether it can obtain an echo monitor resource or not.

The "echo monitor started" state is when the actual estimation of the bulk delay is done. In the "echo monitor started" state, the echo monitor 612 returns whether an echo has been found or not and an estimate of the bulk delay. The echo monitor 612 waits for a certain time buffering for near end and far end speech before it attempts to find an estimate of the bulk delay. This time buffering is somewhere between the minimum and maximum bulk delay. After the configurable time has elapsed, if an echo has been found to be reliable, the state machine transitions to the "echo monitor wait" state and initiates the echo found timer. If an echo has reliably not been found, the state machine transitions to the "echo monitor wait" state and initiates the echo not found timer. If the presence or absence of an echo is unreliable or when echo characteristics are detected to have changed significantly such as in the case of bulk delay changes, the echo monitor state machine transitions to the "echo monitor wait" state and does not initiate any additional timers and just waits for the next far end talk burst. If the far end talk burst finishes while buffering data in the "echo monitor started" state, a determination is made as to whether sufficient far end talk burst data exists to determine a meaningful value of the bulk delay. If the duration of the far end talk-burst is less than a specified threshold, then the echo monitor computation is stopped early and the state machine reverts to the "echo monitor wait" state. In this case, it does not need to wait for a certain time to pass before attempting to regain control of an echo monitor resource.

Due to jitter buffer adjustments and clock skew corrections that are possible in network based echo cancellers, there is a need in certain embodiments for the estimate of the bulk delay to be adjusted in the echo monitoring and cancelling capability provided by the AEC functionality in the media server. This is because the near signal can be shifted in relation to the far signal due to the jitter buffers adjusting for clock skew. This in turn results in the bulk delay estimate needing to be adjusted, otherwise the bulk delay estimate could be slightly off and may result in poor cancellation from the point of the adjustment.

III. Echo Cancellation

Once echo monitoring is complete, near AEC processing objects 620 with a detected echo then look for a free echo canceller 610. If a free echo canceller 610 is found, the near AEC processing object 620 takes it and starts echo cancelling. If a free echo canceller 610 is not found, the near AEC processing object 620 compares its measured ERL during the echo monitoring stage to the ERL of the other echo cancellers 610 in use and if its echo is stronger (i.e., a smaller ERL), then it may steal the echo canceller 610 from the port with the smallest echo (largest ERL subject to the hysteresis discussed below).

Hysteresis is employed to prevent echo cancellers 610 from bouncing around too much from port to port. The hysteresis has a time and an ERL component. In order to steal an echo canceller 610, the ERL of the new port is determined to be worse than the ERL of the old port by a certain ERL margin and the echo canceller 610 of the old port is determined to have been assigned for more than a certain time threshold.

The previous description assumes that the near AEC processing object 620 is in automatic mode. If the AEC override mode is set to "forced on," then the near AEC processing object 620 steals the echo canceller 610 (if a free one is not available) from the port with the smallest echo regardless of the echo measurement of its own port or how long the AEC has been assigned to the other port. Note that in order to do echo cancelling, an echo is first detected on a port and a valid bulk delay measured. Thus, turning the AEC override mode to "forced on" has no effect on ports without echo. As long as a successful bulk delay measurement has been made in the past and there is a free echo canceller 610, "forced on" will take effect. If not, it will take effect as soon as both conditions do become true.

If AEC override mode is set to "forced off," then the near AEC processing object 620 frees its echo canceller 610 if it had one and does not attempt to get one even if echo is detected. The AEC override mode can be changed at any time during a call from "forced on" to "forced off" to "auto."

In certain embodiments, the echo canceller 610 of the near AEC processing object 620 includes a state machine that controls the behavior of the echo canceller 610. The acoustic echo canceller 610 may include two states: an "off" and an "on" state. The AEC "off" state signifies the absence of an echo in the near end signal so that resources do not need to be allocated to perform echo cancellation. As soon as an event is received from the echo monitor 612 signifying that an estimate of the bulk delay has been obtained and hence an echo found, it is desirable to turn echo cancelling on if resources are available or this channel is bumping another channel currently doing echo cancellation.

Resources are checked to see if they are available by managing the list of all AEC channels that are performing echo cancellation. The list includes the following information of the particular channel: ERL; "override on" or "auto" mode flag; and time that echo cancellation has been on. To bump an existing port doing echo cancellation, the new port should satisfy both the hysteresis threshold requirement that the ERL exceed by the hysteresis level threshold the ERL of the port with the smallest echo currently making use of an echo canceller 610, and the hysteresis time requirement that the port with the largest ERL has been performing echo cancellation for at least the hysteresis bumping time period threshold. The hysteresis bumping time period and level threshold are configurable parameters. If resources are still unavailable, the particular port will contend for the limited resources in future processing cycles.

In the case of "override off" mode, the state machine of the echo canceller 610 stays in the "off" state. In the case of "override on" mode, this particular port bumps off the port with the highest ERL value (i.e., smallest echo) that is not in "override on" mode. The bumped port does not need to satisfy the time requirement of having had echo cancellation performed on it for a certain amount of time as required in the automatic mode. The "override off" mode means that the particular channel has no echo cancellation being performed on that port (i.e., it is overriding the automatic mode and disabling echo cancellation). The "override on" mode means that the particular channel has echo cancellation being performed on that port provided it has been able to obtain a bulk delay estimate (i.e., an echo is present or was present at some earlier point in time).

The AEC "on" state is the state in which the echo canceller 610 is actually activated and echo cancelling is performed. If a channel that is currently performing AEC is bumped by another channel, the bumped channel is transitioned to the AEC "off" state to compete for resources. If a port is in this state and the "override on" mode is set, it stays in this state irrespective of whether an echo still exists or not. If "override off" mode is set while in this state, the state machine of the echo canceller 610 transitions to the AEC "off" state. If the AEC off event is received while in this state, the state machine of the echo canceller 610 transitions to the AEC "off" state.

The echo canceller 610 and echo monitor 620 work together to ensure effective cancellation of echo. It is desirable to have the ability to provide dynamic adjustment of the bulk delay estimate using a run time feedback control that determines whether any given audio stream which is undergoing acoustic echo cancellation is no longer able to cancel echo as effectively. This information is then made use of by the bulk delay estimation as part of the echo monitor 612 in making an adjustment, if necessary, to the current estimate of the bulk delay which should then subsequently result in better echo cancellation.

IV. AEC Port Based Statistics

In certain embodiments, a media server (e.g., the VoIP media server 400 shown in FIG. 4 or the VoIP media server 500 shown in FIG. 5) reports AEC statistics when it receives a per port statistics command. As shown in Table 1 below, one example embodiment includes eleven AEC statistics that are included in the per port statistics message.

TABLE 1

| STATISTICS | DESCRIPTION |
| --- | --- |
| enabled-time | AEC enabled time is the amount of time that the AEC has been enabled in the media server. It reads zero if the AEC is not enabled on a port. |
| active-time | AEC active time is the cumulative amount of time that the AEC has been active since the AEC has been enabled. It reads zero if the AEC has never been active on a port. |
| out-of-resource | This is a Boolean flag that when true indicates that at some point while the AEC was enabled, the AEC needed to be activated but could not without exceeding the number of "active echo canceller" resources configured. |
| bulk-delay | AEC bulk delay is the most recent bulk delay estimate. It has a range of 0 to a configurable maximum bulk delay possible and reads 0 if the AEC is not enabled or if bulk delay estimation is not yet complete or there is not enough echo in the signal to measure the bulk delay. |
| bulk-delay-max | The maximum of the bulk delay measurements. |
| bulk-delay-min | The minimum of the bulk delay measurements and reads zero before a valid bulk delay has been measured but it would not stay stuck at zero once a valid reading is found. |
| erl | The ERL statistics is the most recent ERL estimate. It has a range of 0 to 96 (in unit of dB) and reads 96 dB if the AEC is not enabled or if it is enabled but the ERL measurement is not yet complete or there has not been enough of an echo to measure the ERL. Note that a min and max for this statistic may be included so that the severity of the echo throughout the call can be judged. |
| erl-max | The maximum ERL value measured. |
| erl-min | The minimum ERL value measured and reads 96 before a valid ERL has been measured but it would not stay stuck at zero once a valid reading is found. |
| erle | The ERLE statistics is the most recent ERLE estimate. It has a range of 0 to 96 (in unit of dB) and reads 0 if the AEC is not enabled and active on a port. |
| erle-max | The maximum of the ERLE measurement. |
| erle-min | The minimum of the steady state ERLE measurement. |

The per port statistics enable a mechanism whereby an application server can override and control the behavior and application of AEC functions provided by the IP media server based on the events discussed in Table 1.

The AEC per port statistics (PPS), according to one embodiment, may be reported by the IP media server to an external network element over a communication protocol such as SIP transport carrying XML encoded PPS messages. In addition, the IP media server may be further configured in one embodiment, based on the AEC PPS, to be controlled by an application server or other network element as a recipient of the PPS, to override the behaviour and application of AEC functions provided by the IP media server, where the control of the IP media server is provided over a communication protocol such as SIP transport carrying XML encoded control messages.

V. Report AEC Events

In certain embodiments, a media server (e.g., the VoIP media server 400 shown in FIG. 4 or the VoIP media server 500 shown in FIG. 5) has the ability to report AEC events for audio streams that are AEC enabled. AEC events may be sent only when there is a change in one of two conditions, an echo being present or not, and an echo canceller 610 being enabled or not but no sooner than the configured minimum reporting interval. The default state is no echo detected and echo canceller 610 not active. The AEC event, according to one embodiment, is shown in Table 2 below.

TABLE 2

| AEC EVENT FIELD | DESCRIPTION |
| --- | --- |
| echo-detected | Boolean specifying whether echo is detected on a port or not. |
| echo-canceller-active | Boolean specifying whether an echo canceller is active on a port or not. |
| reason-code | The reason why the echo canceller is not active when echo-detected is true and echo-canceller-active is false. No reason: The default value for all cases except when echo is detected and a canceller cannot be made active. Not enough echo canceller resources: Echo is detected but cannot activate an AEC due to not enough echo canceller resources. AEC is Forced Off: Echo is detected but cannot activate an AEC due to active-mode being "forced off". |
| erl | The most recent ERL measurement in dB. |
| bulk-delay | The most recent bulk-delay measurement. |

The AEC events are enabled by setting the AEC event reporting interval to a non-zero value. Note that echo not being detected and the echo canceller 610 not active on a port is the default condition, so this event is reported only if echo has been detected and/or an echo canceller 610 is active on a port and subsequently not active on a port.

The AEC events, according to one embodiment, may be reported by the IP media server to an external network element over a communication protocol such as SIP transport carrying XML encoded event messages. In addition, the IP media server may be further configured in one embodiment, based on the AEC events, to be controlled by an application server or other network element as a recipient of the events, to override the behaviour and application of AEC functions provided by the IP media server, where the control of the IP media server is provided over a communication protocol such as SIP transport carrying XML encoded control messages.

VI. OAMP System Logging Statistics

The following statistics are useful, according to an example embodiment, for reporting through an operation, administration, maintenance, and provisioning (OAMP) interface for status reporting: the maximum number of ports on which AEC is enabled and active; the maximum number of ports on which AEC is enabled and could not be active due to resource limitations; the number of echo monitor resource requests made; the number of echo monitor resource requests denied due to insufficient resources; and the maximum number of simultaneous echo monitoring resources in use at any given time.

These statistics may be useful to provide a mechanism, where based on these statistics, the media server can be reconfigured to modify the behavior and application of the AEC functions provided by the IP media server.

VII. Configurable Parameters

The following configuration parameters, according to certain example embodiments:

A. A boolean flag that indicates whether AEC is enabled or disabled on eligible conference ports or peer-to-peer ports. If enabled, then AEC functionality may be activated if resources exist and an echo has been found. If disabled, then AEC functionality is not enabled on particular ports. The ability to enable or disable AEC on certain ports permits an application server to offer two classes of service, one class with AEC on the ports, and a second class without AEC. Note that when the AEC is disabled, there are no AEC processing objects at all. When the AEC is enabled but in override mode "forced off," then the AEC still provides the echo monitoring function but without echo cancelling if an echo is detected. This is similar to the case if no AEC resources were reserved.

B. The number of echo canceller resources to be reserved.

C. The number of echo monitoring resources to be reserved. If no echo monitor resources are reserved, then the presence or absence of an echo cannot be determined, making it unnecessary to have AEC enabled as irrespective of the number of echo canceller resources, echo cancellation cannot be performed. However, it is possible to reserve echo monitoring resources with no echo cancelling resources. This is useful for monitoring the echo without actually cancelling it.

D. Maximum supported bulk delay, which indicates the maximum possible bulk delay that is supported within the echo monitor resource when an echo is present and hence bulk delay measurements are valid.

E. Far end talk burst duration, which indicates the duration of the far end talk burst that is used for correlating against the near speech which may contain the possible echo signal.

F. Echo monitor queue length, which indicates the length of the echo monitor queue if insufficient resources are available for echo monitoring. The queue can have different priorities depending on what is the least measured ERL if an echo exists or whether an echo was found to not exist based on previous echo monitoring measurements or whether no prior echo monitoring measurement had been made. The highest priority stream may be placed at the top of the queue so as to get access to the first available echo monitor resource.

G. Echo change interval, which indicates, when an echo is present and hence bulk delay measurements are valid, the configured minimum waiting time interval prior to the next request of the echo monitor resource, after waiting for the next talk burst, in monitoring whether any change in echo characteristics or the disappearance of the echo could have occurred on any AEC enabled audio stream.

H. Echo off interval, which indicates, when an echo is absent on an audio stream, the configured minimum waiting time interval prior to the next request of the echo monitor resource, after waiting for the next talk burst, in monitoring the emergence of echo on any AEC enabled audio stream.

I. Override mode flag, which indicates the AEC mode as either forced on, forced off, or auto. In "forced on" mode, the media server is forced to activate the AEC as long as there is measured echo regardless of the amount of echo. If necessary, the media server will deactivate the AEC on another port (e.g., with smallest echo) in order to remain below. If too many ports are forced on, there may not be enough echo canceller resources for all of them. Note that forcing on takes effect only after an echo is first detected. In "forced off" mode, the media server is forced to deactivate the AEC even if there is a measured echo and a free echo canceller resource. In "auto" mode, the acoustic echo cancellation is applied depending on specific stream echo characteristics on any AEC enabled audio stream. The automatic activation algorithm is that the media server activates the AEC on a priority basis where the AEC enabled ports with the lowest ERL (i.e., largest echo) get echo canceller resources first.

J. ERL bumping level threshold, which indicates to bump an existing port doing echo cancellation, the new port should satisfy the hysteresis threshold requirement that the ERL exceed by the hysteresis level threshold the ERL of the port with the smallest echo that is currently making use of an echo canceller resource.

K. ERL bumping time period threshold, which indicates to bump an existing port doing echo cancellation, the hysteresis time requirement that the port with the largest ERL has been performing echo cancellation for at least the hysteresis bumping time period threshold.

L. ERL no echo threshold, which indicates the level below which an echo is deemed to no longer exist and the echo canceller can be turned off on any AEC enabled audio stream.

M. ERL no echo hysteresis time period threshold, which indicates the time period in which the echo falls below and stays below the no echo threshold and the echo can be turned off to prevent needless switching off and on of echo cancellation on an AEC enabled audio stream.

The described features, operations, or characteristics described herein may be combined in any suitable manner in one or more embodiments. It will also be readily understood that the order of the steps or actions of the methods described in connection with the embodiments disclosed may be changed as would be apparent to those skilled in the art. Thus, any order in the drawings or detailed description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a machine-readable medium having stored thereon instructions that may be used to program a computer (or other electronic device) to perform the processes described herein. The machine-readable medium may be a non-transitory computer readable medium and may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media suitable for storing electronic instructions.

As will be understood by those skilled in the art in the light of the foregoing disclosure, many alterations and modifications are possible in the practice of this invention without departing from the spirit or scope thereof. For example, as noted above, all threshold and parameter values that are selected could use alternative values. The measures used to detect an echo and measure the bulk delay could be obtained in a number of ways, which are well known to persons skilled in the art and do not take away from the inventions in this disclosure. The scope of the present invention should, therefore, be determined only by the following claims.

The invention claimed is:

1. A system for providing acoustic echo monitoring and cancellation for real time media processing in an internet protocol (IP) network, the system comprising:
    an IP media server comprising:
    a plurality of ports for providing real time peer-to-peer services or audio mixing of a number of participants of an audio conference;
    a pool of media processing resources configured to be assignable to a selected port from the plurality of ports with processing instructions for processing audio streams passing through the selected port, wherein at least one of the media processing resources is configured with instructions to form:
    an echo monitor configured from the pool of media processing resources to selectively compare two or more audio streams into and out of the IP media server through the selected port of the plurality of ports, the comparison to determine an occurrence of an echo; and an echo canceller configured from the pool of media processing resources when the echo monitor determines the occurrence of the echo and when sufficient resources exist in the pool of media processing resources to allocate the echo canceller, the echo canceller in communication with the echo monitor and configured to, in response to the determination by the echo monitor, remove the echo from at least one of the audio streams, wherein the IP media server includes a plurality of media processing resources that are each selectively configurable to be applied towards acoustic echo monitoring, and wherein the IP media server selects a number of the media processing resources to dedicate to acoustic echo monitoring based on a tradeoff between reducing an availability of the media processing resources for other functions and speed of echo detection.

2. The system of claim 1, wherein the IP media server further comprises:

a talk burst detector configured to detect speech in at least one of the audio streams through the selected port, wherein the echo monitor selectively compares the audio streams in response to a signal from the talk burst detector indicating detection of speech.

3. The system of claim 1, wherein the IP media server includes a plurality of media processing resources that are each selectively configurable to be applied towards acoustic echo monitoring, and wherein the IP media server allows a user to reserve a portion of the media processing resources for allocation to selected ports.

4. The system of claim 3, wherein the IP media server allows the user to reserve the portion of the media processing resources based on at least one of a configurable percentage of available media processing resources and a configurable percentage of total real time audio streams on the IP media server.

5. The system of claim 1, wherein the IP media server is configured to be controlled by network elements, external to the IP media server, to reserve a certain number of resources for simultaneous acoustic echo monitoring.

6. The system of claim 1, wherein the IP media server is configured to optimize the dedication of the media processing resources to acoustic echo monitoring by disabling echo monitoring for audio streams for a duration defined by an echo change interval, wherein continuing to monitor the selected port after the echo change interval indicates whether the echo is still present and whether prior bulk delay measurements of an echo are still valid for estimating the echo, and wherein a configured minimum waiting time interval, based on the echo change interval, is set to occur prior to a timing of a next request of the echo monitor in monitoring whether changes in echo characteristics or the disappearance of the echo have occurred.

7. The system of claim 1, wherein the IP media server provides a periodic bulk delay estimation based on adjustments in network elements delays external to the IP media server.

8. The system of claim 1, wherein the IP media server is configured to optimize the dedication of the media processing resources to acoustic echo monitoring by disabling echo monitoring for audio streams for a duration defined by an echo off interval, wherein, when an echo is absent on an audio stream, a configured minimum waiting time interval based on the echo off interval occurs prior to a next request of the echo monitor in monitoring the emergence of echo, on any acoustic echo cancellation (AEC) enabled audio stream associated with audio conferencing or peer-to-peer services provided by the IP media server.

9. The system of claim 1, wherein the IP media server is configured to respond to requests for dedication of the media processing resources to acoustic echo monitoring on finding a next suitable talk burst without waiting for any additional interval when a presence or absence of echo is not yet determined or when echo characteristics are detected to have changed beyond a threshold, on any acoustic echo cancellation (AEC) enabled audio stream associated with audio conferencing or peer-to-peer services provided by the IP media server.

10. The system of claim 1, wherein the IP media server is configured to optimize the dedication of the media processing resources to acoustic echo monitoring based on initiating a request for monitoring of echo only after detection of talk bursts in a far end audio stream when determining the presence and severity of echo present in audio streams of any given participant of an IP conference or a peer-to-peer service.

11. The system of claim 10, wherein the IP media server is configured to provide media processing echo monitoring resource requests being accepted if sufficient resources exist for echo monitoring, wherein if insufficient resources exist, the request is queued into a configurable length queue that holds different streams having different priorities depending on at least one of:

a last measured echo return loss (ERL) if an echo exists;

whether an echo was found to not exist based on a previous echo monitoring measurement; and whether no prior echo monitoring request had been made, and wherein a highest priority stream is placed at a top of the queue so as to get access to a first available echo monitor resource.

12. The system of claim 11, wherein the IP media server is configured to provide media processing echo monitoring resource optimization based on limiting a duration of the echo monitoring capability being kept on, to be upper bounded by a sum of a duration value of the far-end talk burst and a maximum bulk delay value, in the audio streams of any given participant of an IP conference or a peer-to-peer service.

13. The system of claim 11, wherein the IP media server is configured to provide media processing echo monitoring resource optimization based on turning off echo monitoring resource usage if the far end talk burst is not sufficiently long to provide meaningful data in attempting to detect an echo and compute the bulk delay, in the audio streams of any given participant of an IP conference or a peer-to-peer service.

14. The system of claim 1, wherein the IP media server is configured to:

dynamically adjust a bulk delay estimate in the echo cancellation function based on jitter buffer and clock skew corrections, wherein the estimate is determined periodically based on the IP media server's processing interval; and if an echo is deemed to exist, account for dynamic jitter buffer adjustments in an algorithm to determine the bulk delay as part of the echo monitoring.

15. The system of claim 1, wherein the IP media server is configured to be controlled by at least one network element, external to the IP media server, to perform at least one function selected from the group comprising:

setting a maximum bulk delay, which indicates a maximum possible bulk delay supported within the echo monitor when an echo is present, on any acoustic echo cancellation (AEC) enabled audio stream associated with audio conferencing or peer-to-peer services provided by the IP media server;

setting an echo change interval, which indicates when an echo is present, wherein a configured minimum waiting time interval occurs prior to a next request of the echo monitor in monitoring whether changes in echo characteristics or the disappearance of the echo have occurred, on any AEC enabled audio stream associated with audio conferencing or peer-to-peer services provided by the IP media server; and setting an echo off interval that indicates when an echo is absent in an audio stream, wherein a configured minimum waiting time interval based on the echo off interval occurs prior to a next request of the echo monitor in monitoring the emergence of echo, on any AEC enabled audio stream associated with audio conferencing or peer-to-peer services provided by the IP media server.

16. The system of claim 1, wherein the IP media server includes a plurality of media processing resources that are each selectively configurable to be applied towards acoustic echo cancellation, and wherein the IP media server allows a user to reserve a portion of the media processing resources for allocation to selected ports.

17. The system of claim 16, wherein the IP media server allows the user to reserve the portion of the media processing resources based on at least one of a percentage of available media processing resources and a configurable percentage of total real time audio streams on the IP media server.

18. The system of claim 1, wherein the IP media server is configured to be controlled by network elements, external to the IP media server, to reserve a certain number of resources for simultaneous acoustic echo cancellation.

19. The system of claim 1, wherein the IP media server provides media processing echo cancellation resource optimization by using acoustic echo monitoring to determine a presence and severity of echo present in audio streams of any given participant of an IP conference or a peer-to-peer service.

20. The system of claim 19, wherein the IP media server provides media processing echo cancellation resource optimization based on determining an echo return loss (ERL) in audio streams of any given participant of an IP conference or a peer-to-peer service, and wherein the IP media server determines the severity of acoustic echo based on measured ERL on any given audio stream while applying acoustic echo cancellation on the streams experiencing the worst echo characteristics.

21. The system of claim 20, wherein the IP media server provides configurable controls based on ERL threshold settings enabling acoustic echo cancellation only on the audio streams exhibiting ERL lower than the configured threshold setting.

22. The system of claim 21, wherein the IP media server provides an optimization where the IP media server's media processing echo cancellation resources are conserved by applying echo cancellation functions on a configurable percentage of real time audio streams which are exhibiting the most echo distortion.

23. The system of claim 21, wherein the IP media server dynamically adjusts in real time the amount of media processing resources applied towards acoustic echo cancellation.

24. The system of claim 23, wherein the IP media server provides a dynamic adjustment of media processing resource allocation using a run time control which determines whether any given audio stream requires acoustic echo cancellation, dynamically activating acoustic echo cancellation, and dynamically removing acoustic echo cancellation when presence of echo is deemed to be below a given threshold and stays below the threshold for a predetermined time period.

25. The system of claim 23, wherein the IP media server dynamically adjusts media processing resource allocation using a run time control which forces echo cancellation to be off for a given audio stream whether or not echo has been detected on that stream.

26. The system of claim 23, wherein the IP media server dynamically adjusts media processing resource allocation using a run time control which forces echo cancellation to be on for a given audio stream once an echo is detected and to keep performing echo cancellation even in the absence of an echo subsequently on the given audio stream.

27. The system of claim 24, wherein the IP media server dynamically adjusts media processing resource allocation using a run time control which determines whether a new audio stream that requires acoustic echo cancellation but failed to find a free resource can bump an audio stream with a smallest echo that is currently making use of an echo canceller resource as the new stream's ERL exceeds the smallest echo ERL by a configurable bumping level threshold.

28. The system of claim 24, wherein the IP media server dynamically adjusts media processing resource allocation using a run time control which determines whether any given audio stream that requires acoustic echo cancellation but failed to find a free resource can bump an audio stream with a smallest echo that is currently making use of an echo canceller resource provided the bumped port's active time exceeds a configurable bumping time period threshold.

29. The system of claim 26, wherein the IP media server dynamically adjusts media processing resource allocation using a run time control which determines whether any given audio stream that requires acoustic echo cancellation but failed to find a free resource can bump an audio stream with a smallest echo that is currently making use of an echo canceller resource provided the bumped stream is not currently in forced on mode.

30. The system of claim 1, wherein the IP media server provides a dynamic adjustment of a bulk delay estimate using a run time feedback control which determines whether any given audio stream which is undergoing acoustic echo cancellation includes an acoustic echo that exceeds a threshold, wherein the determination is used by the bulk delay estimation as part of the echo monitor in making an adjustment, if necessary, to a current estimate of the bulk delay which then subsequently results in the acoustic echo no longer exceeding the threshold.

31. The system of claim 1, wherein the IP media server is configured to be controlled by at least one network element, external to the IP media server, to:

for any audio stream associated with audio conferencing or peer-to-peer services provided by the IP media server, enable or disable acoustic echo cancellation capability; and for acoustic echo cancellation (AEC) enabled audio streams, to perform at least one function selected from the group comprising:

forcing applying acoustic echo cancellation;

forcing not applying acoustic echo cancellation;

applying acoustic echo cancellation depending on the specific stream echo characteristics;

setting an echo return loss (ERL) bumping level threshold, which is used when a new audio stream which required an echo canceller resource but failed to find a free resource bumps an audio stream with a smallest echo currently making use of an echo canceller resource as the new audio stream's ERL exceeded the smallest echo ERL by the bumping level threshold;

setting an ERL bumping time period threshold, which is used when an audio stream which required an echo canceller resource but failed to find a free resource bumped an audio stream with a smallest echo currently making use of an echo canceller resource provided the bumped port's active time exceeds the configurable bumping time period threshold;

setting a no echo threshold, which indicates a level below which an echo is deemed to no longer exist and the echo canceller can be turned off; and setting a no echo hysteresis time period, which indicates a time period in which the echo falls below and stays below the no echo threshold and the echo canceller is turned off to prevent needless switching off and on of echo cancellation.

32. The system of claim 1, wherein the IP media server is configured to report acoustic echo cancellation (AEC) events for audio media streams which are AEC enabled, wherein the AEC events generated by the IP media server include one or more of:

echo detected (true/false);
echo canceller active (true/false);
reason codes for echo detected and echo canceller not active, including:
no-reason;
not enough AEC media processing resources; and
AEC forced-off;
most recent ERL measurement; and
most recent bulk delay measurement, and
wherein the events are reported by the IP media server to external network elements over a communication protocol.

33. The system of claim 32, wherein the IP media server is further configured to, based on the AEC events, be controlled by an application server or other network element as a recipient of the events, to override the behavior and application of AEC functions provided by the IP media server, and wherein the control of the IP media server is provided over a communication protocol.

34. The system of claim 1, wherein the IP media server is configured to report acoustic echo cancellation (AEC) per port statistics (PPS) during a call or at the end of the call for audio media streams which are AEC enabled, wherein the AEC PPS generated by the IP media server include one or more of: AEC enable time; echo canceller active time; echo canceller out of resource flag; current bulk delay measurement; minimum bulk delay measurement; maximum bulk delay measurement; current ERL measurement; minimum ERL measurement; maximum ERL measurement; current ERLE measurement; maximum ERLE measurement; and minimum ERLE measurement, and wherein the statistics are reported by the IP media server to external network elements over a communication protocol.

35. The system of claim 34, wherein the IP media server is further configured to, based on the PPS, be controlled by an application server or other network element as a recipient of the PPS, to override the behavior and application of AEC functions provided by the IP media server, and wherein the control of the IP media server is provided over SIP transport carrying XML encoded control messages.

36. The system of claim 1, wherein the IP media server is configured to report through an operation, administration maintenance and provisioning (OAMP) interface, acoustic echo cancellation (AEC) status reporting for system logging purposes for all audio media streams on the IP media server, wherein the AEC status report generated by the IP media server include one or more of: maximum number of echo cancellers active; maximum number of echo canceller activation requests denied; number of echo monitoring requests; number of echo monitoring requests denied; and number of simultaneous echo monitoring resources in use.

37. The system of claim 36, wherein the IP media server is further configured to, based on the status report, be reconfigured through interfaces to modify the behavior and application of AEC functions provided by the IP media server.

38. The system of claim 1, wherein the IP media server provides optimized use of media processing resources in the audio conference such that audio from N loudest participants is mixed from a total of M conference participants in a conference audio mix, leaving audio out of the conference audio mix from participants not in the N loudest participants, and wherein N<M, thereby upper bounding a required number of echo monitoring and cancellation resources to N.

39. A method for acoustic echo monitoring and cancellation for real time media processing in an internet protocol (IP) network, the method comprising:

providing a pool of media processing resources configured to be assignable to a selected port from the plurality of ports with processing instructions for processing audio streams passing through the selected port, wherein the media processing resources are selectively configurable with instructions to form acoustic echo services including acoustic echo monitoring;

selecting a number of the media processing resources to dedicate to acoustic echo monitoring based on a tradeoff between reducing an availability of the media processing resources for other functions and speed of echo detection;

configuring an echo monitor from the pool of media processing resources;

causing the echo monitor to selectively compare two or more audio streams into and out of the selected port of an IP media server, the comparison determining an occurrence of an echo;

in response to the determination of the occurrence of the echo, configuring an echo canceller from the pool of media processing resources when the echo monitor determines the occurrence of the echo and when sufficient resources exist in the pool of media processing resources to allocate the echo canceller, the echo canceller in communication with the echo monitor; and causing the echo canceller to remove the echo from at least one of the audio streams.

40. The method of claim 39, further comprising:

detecting speech in at least one of the audio streams through the selected port, wherein causing the echo monitor to selectively compare the audio streams occurs in response to the detection of speech.

41. A system for acoustic echo monitoring and cancellation for real time media processing in an internet protocol (IP) network, the system comprising:

means for allocating media processing resources from a pool assignable to a selected port from the plurality of ports with processing instructions for processing audio streams passing through the selected port;

means for selectively comparing the audio streams into and out of the selected port of an IP media server using media processing resources from the pool, the comparison determining an occurrence of an echo; and means for, in response to the determination of the occurrence of the echo, removing the echo from at least one of the audio streams when sufficient resources exist in the pool of media processing resources, wherein the pool of media processing resources are each selectively configurable to be applied towards acoustic echo monitoring, and wherein the means for allocating media processing resources selects a number of the media processing resources to dedicate to acoustic echo monitoring based on a tradeoff between reducing an availability of the media processing resources for other functions and speed of echo occurrence detection.

42. The system of claim 41, further comprising:

means for detecting speech in at least one of the audio streams through the selected port, wherein selectively comparing the audio streams occurs in response to the detection of speech.

\* \* \* \* \*

UNITED STATES PATENT AND TRADEMARK OFFICE
CERTIFICATE OF CORRECTION

| | |
|---|---|
| PATENT NO. | : 8,879,438 B2 |
| APPLICATION NO. | : 13/468947 |
| DATED | : November 4, 2014 |
| INVENTOR(S) | : Saleem et al. |

It is certified that error appears in the above-identified patent and that said Letters Patent is hereby corrected as shown below:

On the title page item (75), change "Mohammed Aamir Husain" to --Mohammad Aamir Husain--.

In the Specification

Column 5, Line 14, change "causes" to --cause--.

Column 11, Line 30, change "adjusted, otherwise" to --adjusted; otherwise--.

Column 12, Line 60, change "echo monitor 620" to --echo monitor 612--.

Column 13, Line 9, change "eleven" to --twelve--.

In the Claims

Column 20, Line 60, Claim 31, change "streams, to perform" to --streams, perform--.

Column 22, Line 5, Claim 36, change "include" to --includes--.

Signed and Sealed this
Twenty-fourth Day of March, 2015

Michelle K. Lee
*Director of the United States Patent and Trademark Office*